US012245013B2

(12) United States Patent
Kordon et al.

(10) Patent No.: US 12,245,013 B2
(45) Date of Patent: *Mar. 4, 2025

(54) METHODS AND APPARATUS FOR DECODING ENCODED HOA SIGNALS

(71) Applicant: Dolby Laboratories Licensing Corporation, San Francisco, CA (US)

(72) Inventors: Sven Kordon, Wunstorf (DE); Alexander Krueger, Burgdorf (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/517,301

(22) Filed: Nov. 22, 2023

(65) Prior Publication Data

US 2024/0171924 A1 May 23, 2024

Related U.S. Application Data

(60) Continuation of application No. 18/081,956, filed on Dec. 15, 2022, now Pat. No. 11,863,958, which is a (Continued)

(30) Foreign Application Priority Data

Jul. 11, 2013 (EP) .................................... 13305986

(51) Int. Cl.
*H04S 3/02* (2006.01)
*G10L 19/008* (2013.01)
*H04S 3/00* (2006.01)

(52) U.S. Cl.
CPC ............ *H04S 3/008* (2013.01); *G10L 19/008* (2013.01); *H04S 2420/11* (2013.01)

(58) Field of Classification Search
CPC ........................... G10L 19/008; H04S 2420/11
(Continued)

(56) References Cited

U.S. PATENT DOCUMENTS

| | | | |
|---|---|---|---|
| 2010/0046762 A1 | 2/2010 | Henn | |
| 2010/0198589 A1 | 8/2010 | Ishikawa et al. | |
| 2012/0155653 A1 | 6/2012 | Jax | |

FOREIGN PATENT DOCUMENTS

| | | |
|---|---|---|
| CN | 1195414 A | 10/1998 |
| CN | 1222996 A | 7/1999 |

(Continued)

OTHER PUBLICATIONS

Daniel, A. et al "Multichannel Audio Coding Based on Minimum Audible Angles" 40th International Conference, Tokyo, Japan, Oct. 2010, pp. 1-10.

(Continued)

*Primary Examiner* — George C Monikang

(57) ABSTRACT

There are two representations for Higher Order Ambisonics denoted HOA: spatial domain and coefficient domain. The invention generates from a coefficient domain representation a mixed spatial/coefficient domain representation, wherein the number of said HOA signals can be variable. An aspect of the invention further relates to methods and apparatus decoding multiplexed and perceptually encoded HOA signals, including transforming a vector of PCM encoded spatial domain signals of the HOA representation to a corresponding vector of coefficient domain signals by multiplying the vector of PCM encoded spatial domain signals with a transform matrix and de-normalizing the vector of PCM encoded and normalized coefficient domain signals, wherein said de-normalizing comprises. The methods may include combining a vector of coefficient domain signals and the vector of de-normalized coefficient domain signals to
(Continued)

determine a combined vector of HOA coefficient domain signals that can have a variable number of HOA coefficients.

3 Claims, 4 Drawing Sheets

Related U.S. Application Data continuation of application No. 17/711,029, filed on Apr. 1, 2022, now Pat. No. 11,540,076, which is a continuation of application No. 17/099,120, filed on Nov. 16, 2020, now Pat. No. 11,297,455, which is a division of application No. 16/525,074, filed on Jul. 29, 2019, now Pat. No. 10,841,721, which is a division of application No. 15/790,375, filed on Oct. 23, 2017, now Pat. No. 10,382,876, which is a division of application No. 15/588,320, filed on May 5, 2017, now Pat. No. 9,900,721, which is a continuation of application No. 14/904,406, filed as application No. PCT/EP2014/063306 on Jun. 24, 2014, now Pat. No. 9,668,079.

(58) Field of Classification Search
USPC ...................................................... 381/22, 23
See application file for complete search history.

(56) References Cited

FOREIGN PATENT DOCUMENTS

| | | | |
|---|---|---|---|
| CN | 101180675 | A | 5/2008 |
| CN | 1735922 | B | 5/2010 |
| CN | 102823277 | A | 12/2012 |
| CN | 102982805 | A | 3/2013 |
| CN | 103004182 | B | 3/2013 |
| CN | 102138342 | B | 3/2014 |
| CN | 102326417 | B | 7/2015 |
| CN | 103635964 | B | 5/2016 |
| CN | 102547549 | B | 6/2016 |
| EP | 2450880 | A1 | 5/2012 |
| EP | 2469742 | A2 | 6/2012 |
| EP | 2553947 | B1 | 5/2014 |
| EP | 2743922 | A1 | 6/2014 |
| EP | 2800401 | A1 | 11/2014 |
| JP | 2012-133366 | A | 7/2012 |
| JP | 2013-133366 | A | 7/2012 |
| JP | 2013000740 | A | 1/2013 |
| JP | 2013-050663 | A | 3/2013 |
| JP | 2013-524564 | A | 6/2013 |
| JP | 2013-545391 | A | 12/2013 |
| JP | 2014-523172 | A | 9/2014 |
| KR | 20120070521 | A | 6/2012 |
| KR | 20130031823 | A | 3/2013 |
| KR | 10-2226620 | B1 | 3/2021 |
| RU | 2422987 | C2 | 6/2011 |
| TW | 200621042 | A | 6/2006 |
| TW | I348684 | B | 4/2007 |
| WO | 2010086342 | A1 | 8/2010 |
| WO | 2011/063594 | A1 | 6/2011 |
| WO | 2012/023864 | A1 | 2/2012 |
| WO | 2012/059385 | A1 | 5/2012 |

OTHER PUBLICATIONS

Hellerud, E. et al "Encoding Higher Order Ambisonics with AAC" 124th Audio Engineering Society Convention, May 17, 2008.
Hellerud, E. et al "Spatial Redundancy in Higher Order Ambisonics and its Use for Low Delay Lossless Compression" IEEE International Conference on Acoustics, Speech and Signal Processing, 2009, pp. 269-272.
Nishimura, Ryouichi "Ambisonics" The Journal of the Institute of Image Information and Television Engineers, 2014, vol. 68, issue 8 pp. 616-620.
Sen, Deep, et al "RM1-HOA Working Draft Text, ISO/IEC JTC1/SC29/WG11, MPEG 2014".
Wabnitz, A. et al "Time Domain Reconstruction of Spatial Sound Fields Using Compressed Sensing" IEEE International Conference on Acoustics, Speech and Signal Processing, May 22, 2011.

METHODS AND APPARATUS FOR DECODING ENCODED HOA SIGNALS

CROSS-REFERENCE TO RELATED APPLICATIONS

This application is a continuation of U.S. patent application Ser. No. 18/081,956, filed Dec. 15, 2022, which is a continuation of U.S. patent application Ser. No. 17/711,029 filed Apr. 1, 2022, now U.S. Pat. No. 11,540,076, which is a continuation of U.S. patent application Ser. No. 17/099,120 filed Nov. 16, 2020, now U.S. Pat. No. 11,297,455, which is a divisional of Ser. No. 16/525,074, filed Jul. 29, 2019, now U.S. Pat. No. 10,841,721, which is a divisional of U.S. patent application Ser. No. 15/790,375, filed Oct. 23, 2017, now U.S. Pat. No. 10,382,876, which is a divisional of U.S. patent application Ser. No. 15/588,320, filed May 5, 2017, now U.S. Pat. No. 9,900,721, which is a continuation of U.S. patent application Ser. No. 14/904,406, filed Jan. 11, 2016, now U.S. Pat. No. 9,668,079, which is U.S. National Stage of International Application No. PCT/EP2014/063306, filed Jun. 24, 2014, which claims priority to European Patent Application No. 13305986.5, filed Jul. 11, 2013, each of which is incorporated by reference in its entirety.

TECHNICAL FIELD

The invention relates to a method and to an apparatus for generating from a coefficient domain representation of HOA signals a mixed spatial/coefficient domain representation of said HOA signals, wherein the number of the HOA signals can be variable.

BACKGROUND

Higher Order Ambisonics denoted HOA is a mathematical description of a two- or three-dimensional sound field. The sound field may be captured by a microphone array, designed from synthetic sound sources, or it is a combination of both. HOA can be used as a transport format for two- or three-dimensional surround sound. In contrast to loudspeaker-based surround sound representations, an advantage of HOA is the reproduction of the sound field on different loudspeaker arrangements. Therefore, HOA is suited for a universal audio format.

The spatial resolution of HOA is determined by the HOA order. This order defines the number of HOA signals that are describing the sound field. There are two representations for HOA, which are called the spatial domain and the coefficient domain, respectively. In most cases HOA is originally represented in the coefficient domain, and such representation can be converted to the spatial domain by a matrix multiplication (or transform) as described in EP 2469742 A2. The spatial domain consists of the same number of signals as the coefficient domain. However, in spatial domain each signal is related to a direction, where the directions are uniformly distributed on the unit sphere. This facilitates analysing of the spatial distribution of the HOA representation. Coefficient domain representations as well as spatial domain representations are time domain representations.

SUMMARY OF INVENTION

In the following, basically, the aim is to use for PCM transmission of HOA representations as far as possible the spatial domain in order to provide an identical dynamic range for each direction. This means that the PCM samples of the HOA signals in the spatial domain have to be normalised to a pre-defined value range. However, a drawback of such normalisation is that the dynamic range of the HOA signals in the spatial domain is smaller than in the coefficient domain. This is caused by the transform matrix that generates the spatial domain signal from the coefficient domain signals.

In some applications HOA signals are transmitted in the coefficient domain, for example in the processing described in EP 13305558.2 in which all signals are transmitted in the coefficient domain because a constant number of HOA signals and a variable number of extra HOA signals are to be transmitted. But, as mentioned above and shown EP 2469742 A2, a transmission in the coefficient domain is not beneficial.

As a solution, the constant number of HOA signals can be transmitted in the spatial domain and only the extra HOA signals with variable number are transmitted in the coefficient domain. A transmission of the extra HOA signals in the spatial domain is not possible since a time-variant number of HOA signals would result in time-variant coefficient-to-spatial domain transform matrices, and discontinuities, which are suboptimal for a subsequent perceptual coding of the PCM signals, could occur in all spatial domain signals.

To ensure the transmission of these extra HOA signals without exceeding a pre-defined value range, an invertible normalisation processing can be used that is designed to prevent such signal discontinuities, and that also achieves an efficient transmission of the inversion parameters.

Regarding the dynamic range of the two HOA representations and normalisation of HOA signals for PCM coding, it is derived in the following whether such normalisation should take place in coefficient domain or in spatial domain.

In the coefficient time domain, the HOA representation consists of successive frames of N coefficient signals $d_n(k)$, n=0, . . . , N−1, where k denotes the sample index and n denotes the signal index.

These coefficient signals are collected in a vector $d(k)=[d_0(k), \ldots, d_{N-1}(k)]^T$ in order to obtain a compact representation.

Transformation to spatial domain is performed by the N×N transform matrix $$\Psi = \begin{bmatrix} \psi_{0,0} & \cdots & \psi_{0,N-1} \\ \vdots & \ddots & \vdots \\ \psi_{N-1,0} & \cdots & \psi_{N-1,N-1} \end{bmatrix}$$

as defined in EP 12306569.0, see the definition of $\Xi_{GRID}$ in connection with equations (21) and (22).

The spatial domain vector $w(k)=[w_0(k) \ldots w_{N-1}(k)]^T$ is obtained from $w(k)=\psi^{-1}d(k)$, (1)

where $\psi^{-1}$ is the inverse of matrix $\psi$.

The inverse transformation from spatial to coefficient domain is performed by $d(k)=\psi\, w(k)$. (2)

If the value range of the samples is defined in one domain, then the transform matrix $\psi$ automatically defines the value range of the other domain. The term (k) for the k-th sample is omitted in the following.

Because the HOA representation is actually reproduced in spatial domain, the value range, the loudness and the dynamic range are defined in this domain. The dynamic range is defined by the bit resolution of the PCM coding. In this application, 'PCM coding' means a conversion of floating point representation samples into integer representation samples in fix-point notation.

For the PCM coding of the HOA representation, the N spatial domain signals have to be normalised to the value range of $-1 \le w_n < 1$ so that they can be up-scaled to the maximum PCM value $W_{max}$ and rounded to the fix-point integer PCM notation $$w'_n = \lfloor w_n W_{max} \rfloor. \qquad (3)$$

Remark: this is a generalised PCM coding representation.

The value range for the samples of the coefficient domain can be computed by the infinity norm of matrix $\psi$, which is defined by $$\|\Psi\|_\infty = \max_n \sum_{m=1}^{N} |\psi_{nm}|, \qquad (4)$$

and the maximum absolute value in the spatial domain $w_{max}=1$ to $-\|\psi\|_\infty w_{max} \le d_n < \|\psi\|_\infty w_{max}$. Since the value of $\|\psi\|_\infty$ is greater than '1' for the used definition of matrix $\psi$, the value range of $d_n$ increases.

The reverse means that normalisation by $\|\psi\|_{n\infty}$ is required for a PCM coding of the signals in the coefficient domain since $-1 \le d_n/\|\psi\|_\infty < 1$. However, this normalisation reduces the dynamic range of the signals in coefficient domain, which would result in a lower signal-to-quantisation-noise ratio. Therefore, a PCM coding of the spatial domain signals should be preferred.

A problem to be solved by the invention is how to transmit part of spatial domain desired HOA signals in coefficient domain using normalisation, without reducing the dynamic range in the coefficient domain. Further, the normalised signals shall not contain signal level jumps such that they can be perceptually coded without jump-caused loss of quality.

In principle, the inventive generating method is suited for generating from a coefficient domain representation of HOA signals a mixed spatial/coefficient domain representation of said HOA signals, wherein the number of said HOA signals can be variable over time in successive coefficient frames, said method including the steps:

- separating a vector of HOA coefficient domain signals into a first vector of coefficient domain signals having a constant number of HOA coefficients and a second vector of coefficient domain signals having over time a variable number of HOA coefficients;
- transforming said first vector of coefficient domain signals to a corresponding vector of spatial domain signals by multiplying said vector of coefficient domain signals with the inverse of a transform matrix;
- PCM encoding said vector of spatial domain signals so as to get a vector of PCM encoded spatial domain signals;
- normalising said second vector of coefficient domain signals by a normalisation factor, wherein said normalising is an adaptive normalisation with respect to a current value range of the HOA coefficients of said second vector of coefficient domain signals and in said normalising the available value range for the HOA coefficients of the vector is not exceeded, and in which normalisation a uniformly continuous transition function is applied to the coefficients of a current second vector in order to continuously change the gain within that vector from the gain in a previous second vector to the gain in a following second vector, and which normalisation provides side information for a corresponding decoder-side de-normalisation;
- PCM encoding said vector of normalised coefficient domain signals so as to get a vector of PCM encoded and normalised coefficient domain signals;
- multiplexing said vector of PCM encoded spatial domain signals and said vector of PCM encoded and normalised coefficient domain signals.

In principle, the inventive generating apparatus is suited for generating from a coefficient domain representation of HOA signals a mixed spatial/coefficient domain representation of said HOA signals, wherein the number of said HOA signals can be variable over time in successive coefficient frames, said apparatus including:

- means being adapted for separating a vector of HOA coefficient domain signals into a first vector of coefficient domain signals having a constant number of HOA coefficients and a second vector of coefficient domain signals having over time a variable number of HOA coefficients;
- means being adapted for transforming said first vector of coefficient domain signals to a corresponding vector of spatial domain signals by multiplying said vector of coefficient domain signals with the inverse of a transform matrix;
- means being adapted for PCM encoding said vector of spatial domain signals so as to get a vector of PCM encoded spatial domain signals;
- means being adapted for normalising said second vector of coefficient domain signals by a normalisation factor, wherein said normalising is an adaptive normalisation with respect to a current value range of the HOA coefficients of said second vector of coefficient domain signals and in said normalising the available value range for the HOA coefficients of the vector is not exceeded, and in which normalisation a uniformly continuous transition function is applied to the coefficients of a current second vector in order to continuously change the gain within that vector from the gain in a previous second vector to the gain in a following second vector, and which normalisation provides side information for a corresponding decoder-side de-normalisation;
- means being adapted for PCM encoding said vector of normalised coefficient domain signals so as to get a vector of PCM encoded and normalised coefficient domain signals;
- means being adapted for multiplexing said vector of PCM encoded spatial domain signals and said vector of PCM encoded and normalised coefficient domain signals.

In principle, the inventive decoding method is suited for decoding a mixed spatial/coefficient domain representation of coded HOA signals, wherein the number of said signals can be variable over time in successive coefficient frames and wherein said mixed spatial/coefficient domain representation of coded HOA signals was generated according to the above inventive generating method, said decoding including the steps:

- de-multiplexing said multiplexed vectors of PCM encoded spatial domain signals and PCM encoded and normalised coefficient domain signals;
- transforming said vector of PCM encoded spatial domain signals to a corresponding vector of coefficient domain signals by multiplying said vector of PCM encoded spatial domain signals with said transform matrix;

de-normalising said vector of PCM encoded and normalised coefficient domain signals, wherein said de-normalising includes:

computing, using a corresponding exponent $e_n(j-1)$ of the side information received and a recursively computed gain value $g_n(j-2)$, a transition vector $h_n(j-1)$, wherein the gain value $g_n(j-1)$ for the corresponding processing of a following vector of the PCM encoded and normalised coefficient domain signals to be processed is kept, j being a running index of an input matrix of HOA signal vectors;

applying the corresponding inverse gain value to a current vector of the PCM-coded and normalised signal so as to get a corresponding vector of the PCM-coded and de-normalised signal;

combining said vector of coefficient domain signals and the vector of de-normalised coefficient domain signals so as to get a combined vector of HOA coefficient domain signals that can have a variable number of HOA coefficients.

In principle the inventive decoding apparatus is suited for decoding a mixed spatial/coefficient domain representation of coded HOA signals, wherein the number of said HOA signals can be variable over time in successive coefficient frames and wherein said mixed spatial/coefficient domain representation of coded HOA signals was generated according to the above inventive generating method, said decoding apparatus including:

means being adapted for de-multiplexing said multiplexed vectors of PCM encoded spatial domain signals and PCM encoded and normalised coefficient domain signals;

means being adapted for transforming said vector of PCM encoded spatial domain signals to a corresponding vector of coefficient domain signals by multiplying said vector of PCM encoded spatial domain signals with said transform matrix;

means being adapted for de-normalising said vector of PCM encoded and normalised coefficient domain signals, wherein said de-normalising includes:

computing, using a corresponding exponent $e_n(j-1)$ of the side information received and a recursively computed gain value $g_n(j-2)$, a transition vector $h_n(j-1)$, wherein the gain value $g_n(j-1)$ for the corresponding processing of a following vector of the PCM encoded and normalised coefficient domain signals to be processed is kept, j being a running index of an input matrix of HOA signal vectors;

applying the corresponding inverse gain value to a current vector of the PCM-coded and normalised signal so as to get a corresponding vector of the PCM-coded and de-normalised signal;

means being adapted for combining said vector of coefficient domain signals and the vector of de-normalised coefficient domain signals so as to get a combined vector of HOA coefficient domain signals that can have a variable number of HOA coefficients.

Advantageous additional embodiments of the invention are disclosed in the respective dependent claims. An aspect of the present invention relates to methods, systems, apparatus and computer readable medium for decoding an HOA representation. The method may include de-multiplexing multiplexed vector of PCM encoded spatial domain signals and vector of PCM encoded and normalized coefficient domain signals. The method may further include transforming the vector of PCM encoded spatial domain signals to a corresponding vector of coefficient domain signals by multiplying the vector of PCM encoded spatial domain signals with a transform matrix. The method may further include de-normalizing the vector of PCM encoded and normalized coefficient domain signals. The de-normalizing may include determining a transition vector based on a corresponding exponent of side information and a recursively computed gain value, wherein the corresponding exponent and the gain value are based on a running index of an input matrix of HOA signal vectors. The de-normalizing may further include applying the corresponding inverse gain value to the vector of PCM encoded and normalized coefficient domain signals in order to determine a corresponding vector of PCM-coded and de-normalized signal. The method may further include combining the vector of coefficient domain signals and the vector of de-normalized coefficient domain signals to determine a combined vector of HOA coefficient domain signals that can have a variable number of HOA coefficients. The apparatus may include means for performing this method. The computer readable, non-transitory storage medium may contain, store, have recorded on it, a digital audio signal decoded according to this method.

BRIEF DESCRIPTION OF DRAWINGS

Exemplary embodiments of the invention are described with reference to the accompanying drawings as follows.

DESCRIPTION OF EMBODIMENTS

Figure 1:
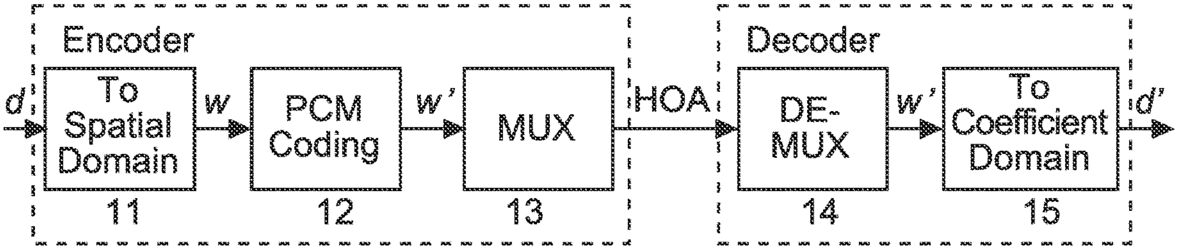
FIG. 1 illustrates PCM transmission of an original coefficient domain HOA representation in spatial domain.

Regarding the PCM coding of an HOA representation in the spatial domain, it is assumed that (in floating point representation) $-1 \le w_n < 1$ is fulfilled so that the PCM transmission of an HOA representation can be performed as shown in FIG. 1. A converter step or stage 11 at the input of an HOA encoder transforms the coefficient domain signal d of a current input signal frame to the spatial domain signal w using equation (1). The PCM coding step or stage 12 converts the floating point samples w to the PCM coded integer samples w' in fix-point notation using equation (3). In multiplexer step or stage 13 the samples w' are multiplexed into an HOA transmission format.

The HOA decoder de-multiplexes the signals w' from the received transmission HOA format in de-multiplexer step or stage 14, and re-transforms them in step or stage 15 to the coefficient domain signals d' using equation (2). This inverse transform increases the dynamic range of d' so that the transform from spatial domain to coefficient domain always includes a format conversion from integer (PCM) to floating point.

The standard HOA transmission of FIG. 1 will fail if matrix $\psi$ is time-variant, which is the case if the number or the index of the HOA signals is time-variant for successive HOA coefficient sequences, i.e. successive input signal frames. As mentioned above, one example for such case is the HOA compression processing described in EP 13305558.2: a constant number of HOA signals is transmitted continuously and a variable number of HOA signals with changing signal indices n is transmitted in parallel. All signals are transmitted in the coefficient domain, which is suboptimal as explained above.

Figure 2:
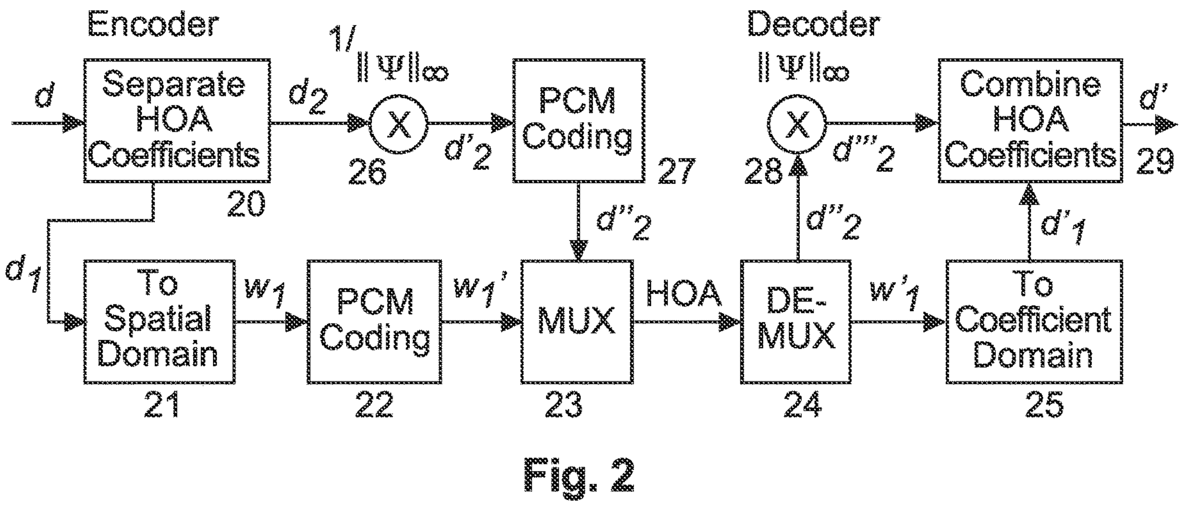
FIG. 2 illustrates combined transmission of the HOA representation in coefficient and spatial domains.

According to the invention, the processing described in connection with FIG. 1 is extended as shown in FIG. 2.

In step or stage 20, the HOA encoder separates the HOA vector d into two vectors $d_1$ and $d_2$, where the number M of HOA coefficient s for the vector $d_1$ is constant and the vector $d_2$ contains a variable number K of HOA coefficients. Because the signal indices n are time-invariant for the vector $d_1$, the PCM coding is performed in spatial domain in steps or stages 21, 22, 23, 24 and 25 with signals corresponding $w_1$ and $W_1$' shown in the lower signal path of FIG. 2, corresponding to steps/stages 11 to 15 of FIG. 1. However, multiplexer step/stage 23 gets an additional input signal $d_2$" and de-multiplexer step/stage 24 in the HOA decoder provides a different output signal $d_2$".

The number of HOA coefficients, or the size, K of the vector $d_2$ is time-variant and the indices of the transmitted HOA signals n can change over time. This prevents a transmission in spatial domain because a time-variant transform matrix would be required, which would result in signal discontinuities in all perceptually encoded HOA signals (a perceptual coding step or stage is not depicted). But such signal discontinuities should be avoided because they would reduce the quality of the perceptual coding of the transmitted signals.

Thus, $d_2$ is to be transmitted in coefficient domain. Due to the greater value range of the signals in coefficient domain, the signals are to be scaled in step or stage 26 by factor 1/$\|\psi\|_\infty$ before PCM coding can be applied in step or stage 27. However, a drawback of such scaling is that the maximum absolute value of $\|\psi\|_\infty$ is a worst-case estimate, which maximum absolute sample value will not occur very frequently because a normally to be expected value range is smaller. As a result, the available resolution for the PCM coding is not used efficiently and the signal-to-quantisation-noise ratio is low.

The output signal $d_2$" of de-multiplexer step/stage 24 is inversely scaled in step or stage 28 using factor $\|\psi\|_\infty$. The resulting signal $d_2$" is combined in step or stage 29 with signal $d_2$', resulting in decoded coefficient domain HOA signal d'.

Figure 3:
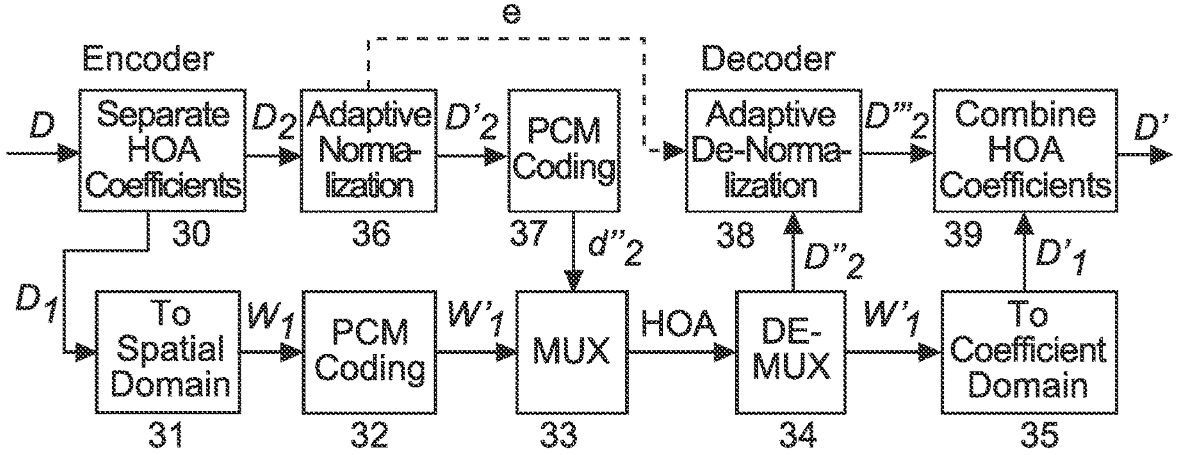
FIG. 3 illustrates combined transmission of the HOA representation in coefficient and spatial domains using block-wise adaptive normalisation for the signals in coefficient domain.

According to the invention, the efficiency of the PCM coding in coefficient domain can be increased by using a signal-adaptive normalisation of the signals. However, such normalisation has to be invertible and uniformly continuous from sample to sample. The required block-wise adaptive processing is shown in FIG. 3. The j-th input matrix D(j)=[d(jL+0) . . . d(jL+L−1)] comprises L HOA signal vectors d (index j is not depicted in FIG. 3). Matrix D is separated into the two matrixes $D_1$ and $D_2$ like in the processing in FIG. 2. The processing of $D_1$ in steps or stages 31 to 35 corresponds to the processing in the spatial domain described in connection with FIG. 2 and FIG. 1. But the coding of the coefficient domain signal includes a block-wise adaptive normalisation step or stage 36 that automatically adapts to the current value range of the signal, followed by the PCM coding step or stage 37. The required side information for the de-normalisation of each PCM coded signal in matrix $D_2$" is stored and transferred in a vector e. Vector $e=[e_{n_1} \ldots e_{n_K}]^T$ contains one value per signal. The corresponding adaptive de-normalisation step or stage 38 of the decoder at receiving side inverts the normalisation of the signals $D_2$" to $D_2$'" using information from the transmitted vector e. The resulting signal $D_2$'" is combined in step or stage 39 with signal $D_2$', resulting in decoded coefficient domain HOA signal D'.

In the adaptive normalisation in step/stage 36, a uniformly continuous transition function is applied to the samples of the current input coefficient block in order to continuously change the gain from a last input coefficient block to the gain of the next input coefficient block. This kind of processing requires a delay of one block because a change of the normalisation gain has to be detected one input coefficient block ahead. The advantage is that the introduced amplitude modulation is small, so that a perceptual coding of the modulated signal has nearly no impact on the denormalised signal.

Regarding implementation of the adaptive normalisation, it is performed independently for each HOA signal of $D_2(j)$. The signals are represented by the row vectors $x_n^T$ of the matrix $$D_2(j) = [d_2(jL+0)\ \ldots\ d_2(jL+L-1)] = \begin{bmatrix} x_1^T(j) \\ \vdots \\ x_n^T(j) \\ \vdots \\ x_K^T(j) \end{bmatrix},$$

wherein n denotes the indices of the transmitted HOA signals. $x_n$ is transposed because it originally is a column vector but here a row vector is required.

Figure 4:
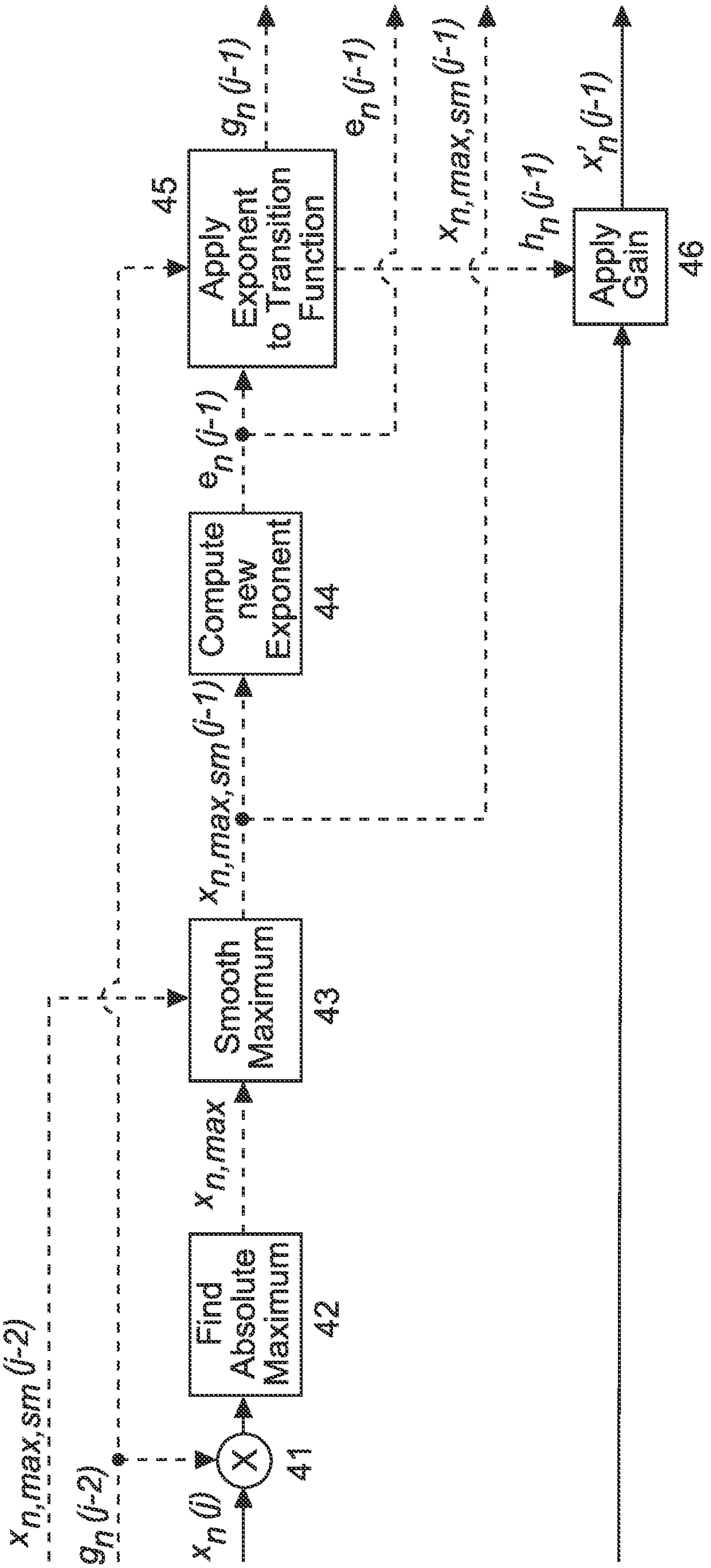
FIG. 4 illustrates adaptive normalisation processing for an HOA signal $x_n(j)$ represented in coefficient domain.

FIG. 4 depicts this adaptive normalisation in step/stage 36 in more detail. The input values of the processing are:

- the temporally smoothed maximum value $x_{n,max,sm}(j-2)$,
- the gain value $g_n(j-2)$, i.e. the gain that has been applied to the last coefficient of the corresponding signal vector block $x_n(j-2)$,
- the signal vector of the current block $x_n(j)$,
- the signal vector of the previous block $x_n(j-1)$.

When starting the processing of the first block $x_n(0)$ the recursive input values are initialised by pre-defined values: the coefficients of vector $x_n(-1)$ can be set to zero, gain value $g_n(-2)$ should be set to '1', and $X_{n,max,sm}(-2)$ should be set to a pre-defined average amplitude value.

Thereafter, the gain value of the last block $g_n(j-1)$, the corresponding value $e_n(j-1)$ of the side information vector e(j−1), the temporally smoothed maximum value $X_{n,max,sm}(j-1)$ and the normalised signal vector $x_n'(j-1)$ are the outputs of theprocessing.

The aim of this processing is to continuously change the gain values applied to signal vector $x_n(j-1)$ from $g_n(j-2)$ to $g_n(j-1)$ such that the gain value $g_n(j-1)$ normalises the signal vector $x_n(j)$ to the appropriate value range.

In the first processing step or stage 41, each coefficient of signal vector $x_n(j)=[x_{n,0}(j) \ldots x_{n,L-1}(J)]$ is multiplied by gain value $g_n(j-2)$, wherein $g_n(j-2)$ was kept from the signal vector $x_n(j-1)$ normalisation processing as basis for a new normalisation gain. From the resulting normalised signal vector $x_n(j)$ the maximum $x_{n,max}$ of the absolute values is obtained in step or stage 42 using equation (5):

$$x_{n,max} = \max_{0 \le l < L} |g_n(j-2) x_{n,l}(j)| \tag{5}$$

In step or stage 43, a temporal smoothing is applied to $x_{n,max}$ using a recursive filter receiving a previous value $x_{n,max,sm}(j-2)$ of said smoothed maximum, and resulting in a current temporally smoothed maximum $x_{n,max,sm}(j-1)$. The purpose of such smoothing is to attenuate the adaptation of the normalisation gain over time, which reduces the number of gain changes and therefore the amplitude modulation of the signal. The temporal smoothing is only applied if the value $x_{n,max}$ is within a pre-defined value range. Otherwise $x_{n,max,sm}(j-1)$ is set to $x_{n,max}$ (i.e. the value of $x_{n,max}$ is kept as it is) because the subsequent processing has to attenuate the actual value of $x_{n,max}$ to the pre-defined value range. Therefore, the temporal smoothing is only active when the normalisation gain is constant or when the signal $x_n(j)$ can be amplified without leaving the value range. $x_{n,max,sm}(j-1)$ is calculated in step/stage 43 as follows:

$$x_{n,max,sm}(j-1) = \begin{cases} x_{n,max} & \text{for } x_{n,max} \geq 1 \\ (1-a)x_{n,max,sm}(j-1) + ax_{n,max} & \text{otherwise} \end{cases}, \quad (6)$$

wherein $0<a\leq 1$ is the attenuation constant.

In order to reduce the bit rate for the transmission of vector e, the normalisation gain is computed from the current temporally smoothed maximum value $x_{n,max,sm}(j-1)$ and is transmitted as an exponent to the base of '2'. Thus $$x_{n,max,sm}(j-1)2^{e_n(j-1)}\leq 1 \quad (7)$$

has to be fulfilled and the quantised exponent $e_n(j-1)$ is obtained from $e_n(j-1)=$ $$\left\lfloor \log_2 \frac{1}{x_{n,max,sm}(j-1)} \right\rfloor \quad (8)$$

in step or stage 44.

In periods, where the signal is re-amplified (i.e. the value of the total gain is increased over time) in order to exploit the available resolution for efficient PCM coding, the exponent $e_n(j)$ can be limited, (and thus the gain difference between successive blocks,) to a small maximum value, e.g. '1'. This operation has two advantageous effects. On one hand, small gain differences between successive blocks lead to only small amplitude modulations through the transition function, resulting in reduced cross-talk between adjacent sub-bands of the FFT spectrum (see the related description of the impact of the transition function on perceptual coding in connection with FIG. 7). On the other hand, the bit rate for coding the exponent is reduced by constraining its value range.

The value of the total maximum amplification $$g_n(j-1)=g_n(j-2)2^{e_n(j-1)} \quad (9)$$

can be limited e.g. to '1'. The reason is that, if one of the coefficient signals exhibits a great amplitude change between two successive blocks, of which the first one has very small amplitudes and the second one has the highest possible amplitude (assuming the normalisation of the HOA representation in the spatial domain), very large gain differences between these two blocks will lead to large amplitude modulations through the transition function, resulting in severe cross-talk between adjacent sub-bands of the FFT spectrum. This might be suboptimal for a subsequent perceptual coding a discussed below.

Figure 5:
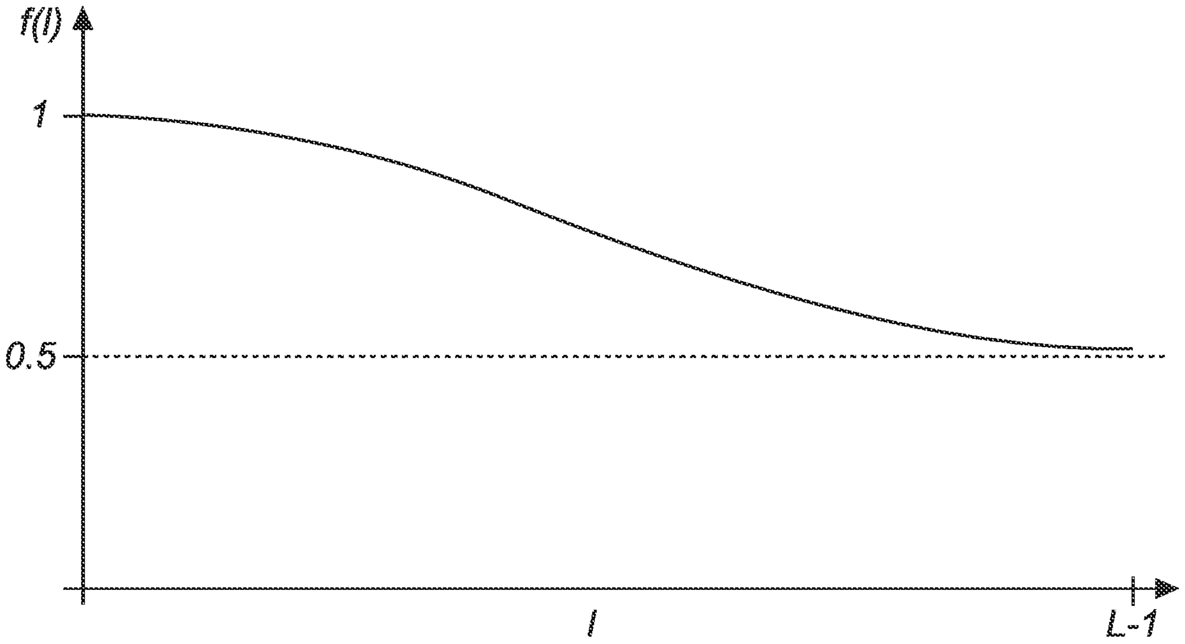
FIG. 5 illustrates a transition function used for a smooth transition between two different gain values.

In step or stage 45, the exponent value $e_n(j-1)$ is applied to a transition function so as to get a current gain value $g_n(j-1)$. For a continuous transition from gain value $g_n(j-2)$ to gain value $g_n(j-1)$ the function depicted in FIG. 5 is used. The computational rule for that function is $$f(l) = 0.25\cos\left(\frac{\pi l}{(L-1)}\right) + 0.75, \quad (10)$$

where l=0, 1, 2, . . . , L−1. The actual transition function vector $$h_n(j-1)=[h_n(0)\ \ldots\ h_n(L-1)]^T \text{ with } h_n(l)=g_n(j-2)f(l)^{-e_n(j-1)} \quad (11)$$

is used for the continuous fade from $g_n(j-2)$ to $g_n(j-1)$. For each value of $e_n(j-1)$ the value of $h_n(0)$ is equal to $g_n(j-2)$ since f(0)=1. The last value of f(L−1) is equal to 0.5, so that $h_n(L-1)=g_n(j-2)0.5^{-e_n(j-1)}$ will result in the required amplification $g_n(j-1)$ for the normalisation of $x_n(j)$ from equation (9).

In step or stage 46, the samples of the signal vector $x_n(j-1)$ are weighted by the gain values of the transition vector it $h_n(j-1)$ in order to obtain $$x_n'(j-1)=x_n(j-1)\otimes h_n(j-1), \quad (12)$$

where the '⊗' operator represents a vector element-wise multiplication of two vectors. This multiplication can also be considered as representing an amplitude modulation of the signal $x_n(j-1)$.

Figure 8:
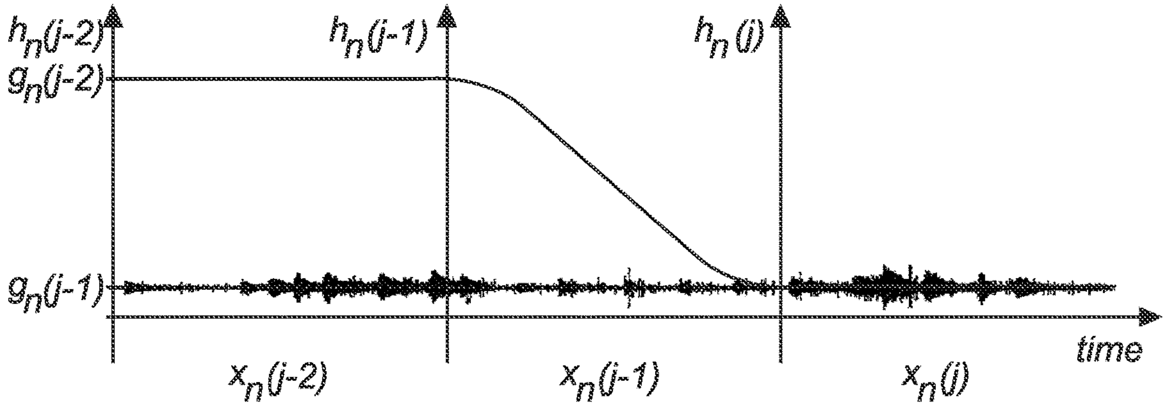
FIG. 8 illustrates example transition functions for three successive signal vectors.

In more detail, the coefficients of the transition vector $h_n(j-1)=[h_n(0)\ \ldots\ h_n(L-1)]^T$ are multiplied by the corresponding coefficients of the signal vector $x_n(j-1)$, where the value of $h_n(0)$ is $h_n(0)=g_n(j-2)$ and the value of $h_n(j-1)$ is $h_n(j-1)=g_n(j-1)$. Therefore the transition function continuously fades from the gain value $x_n(j-2)$ to the gain value $g_n(j-1)$ as depicted in the example of FIG. 8, which shows gain values from the transition functions $h_n(j)$, $h_n(j-1)$ and $h_n(j-2)$ that are applied to the corresponding signal vectors $x_n(j)$, $x_n(j-1)$ and $x_n(j-2)$ for three successive blocks. The advantage with respect to a downstream perceptual encoding is that at the block borders the applied gains are continuous: The transition function $h_n(j-1)$ continuously fades the gains for the coefficients of $x_n(j-1)$ from $g_n(j-2)$ to $g_n(j-1)$.

Figure 6:
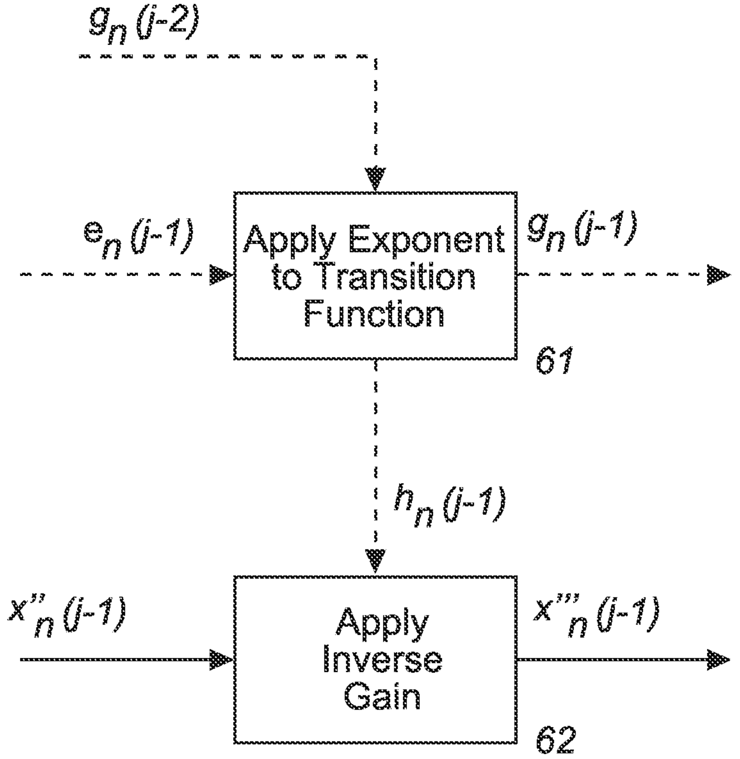
FIG. 6 illustrates adaptive de-normalisation processing.

The adaptive de-normalisation processing at decoder or receiver side is shown in FIG. 6. Input values are the PCM-coded and normalised signal $x_n''(j-1)$, the appropriate exponent $e_n(j-1)$, and the gain value of the last block $g_n(j-2)$. The gain value of the last block $g_n(j-2)$ is computed recursively, where $g_n(j-2)$ has to be initialised by a predefined value that has also been used in the encoder. The outputs are the gain value $g_n(j-1)$ from step/stage 61 and the de-normalised signal $x_n'''(j-1)$ from step/stage 62.

In step or stage 61 the exponent is applied to the transition function. To recover the value range of $x_n(j-1)$, equation (11) computes the transition vector $h_n(j-1)$ from the received exponent $e_n(j-1)$, and the recursively computed gain $g_n(j-2)$. The gain $g_n(j-1)$ for the processing of the next block is set equal to $h_n(j-1)$.

In step or stage 62 the inverse gain is applied. The applied amplitude modulation of the normalisation processing is inverted by $$x_n'''(j-1)=x_n''(j-1)\otimes h_n(j-1)^{-1}, \quad (13)$$

where $$h_n(j-1)^{-1} = \left[ \frac{1}{h_n(0)} \cdots \frac{1}{h_n(L-1)} \right]^T$$

and '⊗' is the vector element-wise multiplication that has been used at encoder or transmitter side. The samples of $x_n''(j-1)$ cannot be represented by the input PCM format of $x_n''(j-1)$ so that the de-normalisation requires a conversion to a format of a greater value range, like for example the floating point format.

Regarding side information transmission, for the transmission of the exponents $e_n(j-1)$ it cannot be assumed that their probability is uniform because the applied normalisation gain would be constant for consecutive blocks of the same value range. Thus entropy coding, like for example Huffman coding, can be applied to the exponent values in order to reduce the required data rate.

One drawback of the described processing could be the recursive computation of the gain value $g_n(j-2)$. Consequently, the de-normalisation processing can only start from the beginning of the HOA stream.

A solution for this problem is to add access units into the HOA format in order to provide the information for computing $g_n(j-2)$ regularly. In this case the access unit has to provide the exponents $$e_{n,access} = \log_2 g_n(j-2) \quad (14)$$

for every t-th block so that $g_n(j-2)=2^{e_{n,access}}$ can be computed and the de-normalisation can start at every t-th block.

The impact on a perceptual coding of the normalised signal $x_n'(j-1)$ is analysed by the absolute value of the frequency response $$H_n(u) = \sum_{l=0}^{L-1} h_n(l) e^{-\frac{2\pi i l u}{L-1}} \quad (15)$$

of the function $h_n(l)$. The frequency response is defined by the Fast Fourier Transform (FFT) of $h_n(l)$ as shown in equation (15).

Figure 7:
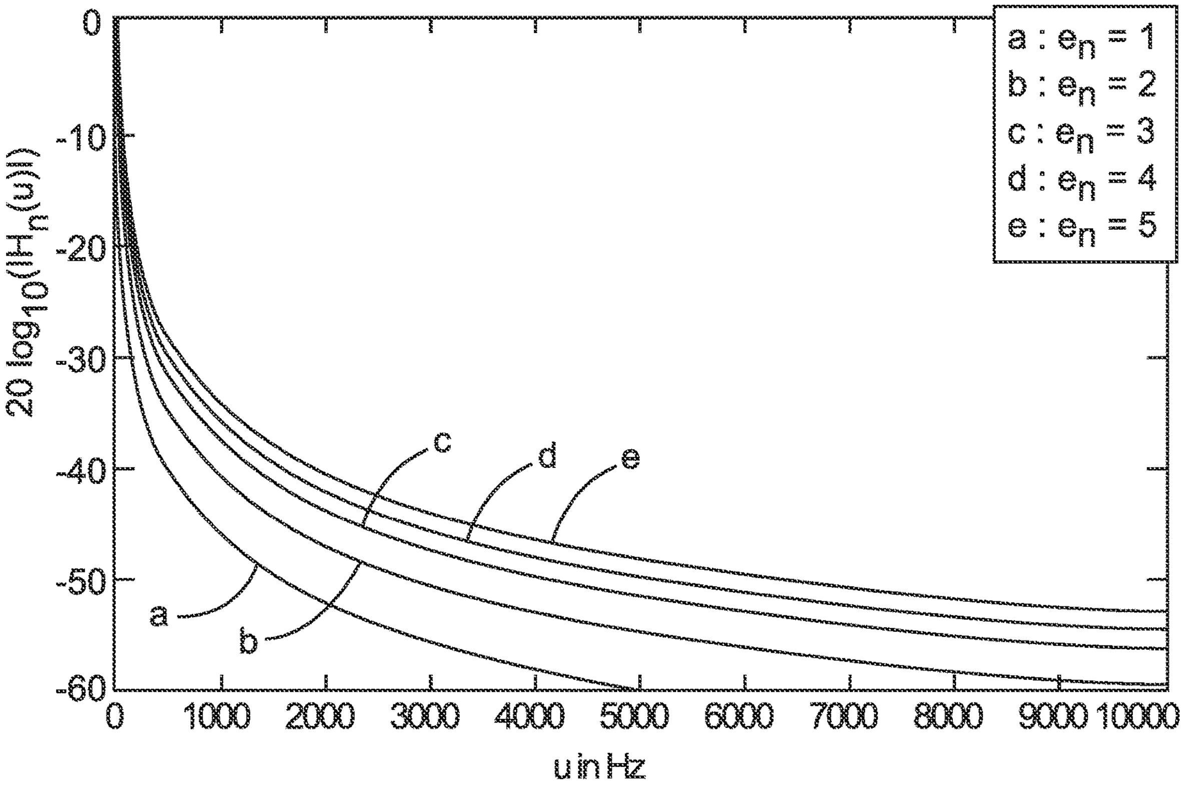
FIG. 7 illustrates FFT frequency spectrum of the transition functions $h_n(l)$ using different exponents $e_n$, wherein the maximum amplitude of each function is normalised to 0 dB.

FIG. 7 shows the normalised (to 0 dB) magnitude FFT spectrum $H_n(u)$ in order to clarify the spectral distortion introduced by the amplitude modulation. The decay of $|H_n(u)|$ is relatively steep for small exponents and gets flat for greater exponents.

Since the amplitude modulation of $x_n(j-1)$ by $h_n(l)$ in time domain is equivalent to a convolution by $H_n(u)$ in frequency domain, a steep decay of the frequency response $H_n(u)$ reduces the cross-talk between adjacent sub-bands of the FFT spectrum of $x_n'(j-1)$. This is highly relevant for a subsequent perceptual coding of $x_n'(j-1)$ because the sub-band cross-talk has an influence on the estimated perceptual characteristics of the signal. Thus, for a steep decay of $H_n(u)$, the perceptual encoding assumptions for $x_n'(j-1)$ are also valid for the un-normalised signal $x_n(j-1)$.

This shows that for small exponents a perceptual coding of $x_n'(j-1)$ is nearly equivalent to the perceptual coding of $x_n(j-1)$ and that a perceptual coding of the normalised signal has nearly no effects on the de-normalised signal as long as the magnitude of the exponent is small.

The inventive processing can be carried out by a single processor or electronic circuit at transmitting side and at receiving side, or by several processors or electronic circuits operating in parallel and/or operating on different parts of the inventive processing.

The invention claimed is:

1. A method for decoding an HOA representation, said decoding comprising:

transforming a vector of PCM encoded spatial domain signals of the HOA representation to a corresponding vector of coefficient domain signals;

de-normalizing a vector of PCM encoded and normalized coefficient domain signals of the HOA representation, wherein the de-normalizing comprises:

determining a transition vector based on a corresponding exponent of side information and a recursively computed gain value, wherein the corresponding exponent and the gain value are based on a running index of an input matrix of HOA signal vectors;

applying a corresponding inverse gain value to the vector of PCM encoded and normalized coefficient domain signals in order to determine a corresponding vector of PCM-coded and de-normalized signal; and combining the vector of coefficient domain signals and a vector of de-normalized coefficient domain signals to determine a combined vector of HOA coefficient domain signals that can have a variable number of HOA coefficients.

2. An apparatus for decoding an HOA representation, the apparatus comprising:

a first processing unit for transforming a vector of PCM encoded spatial domain signals of the HOA representation to a corresponding vector of coefficient domain signals;

a second processing unit for de-normalizing vector of PCM encoded and normalized coefficient domain signals of HOA representation, wherein the second processing unit is adapted for:

determining a transition vector based on a corresponding exponent of side information and a recursively computed gain value, wherein the corresponding exponent and the gain value are based on a running index of an input matrix of HOA signal vectors;

applying a corresponding inverse gain value to vector of PCM encoded and normalized coefficient domain signals in order to determine a corresponding vector of PCM-coded and de-normalized signal; and a combiner for combining the vector of coefficient domain signals and a vector of de-normalized coefficient domain signals to determine a combined vector of HOA coefficient domain signals that can have a variable number of HOA coefficients.

3. A non-transitory storage medium that contains or stores, or has recorded on it, a digital audio signal decoded according to claim 1.

* * * * *